April 3, 1962      G. C. R. BIRCH      3,028,463
SWITCH APPARATUS RESPONSIVE TO LIQUID FLOW
Filed Jan. 19, 1959
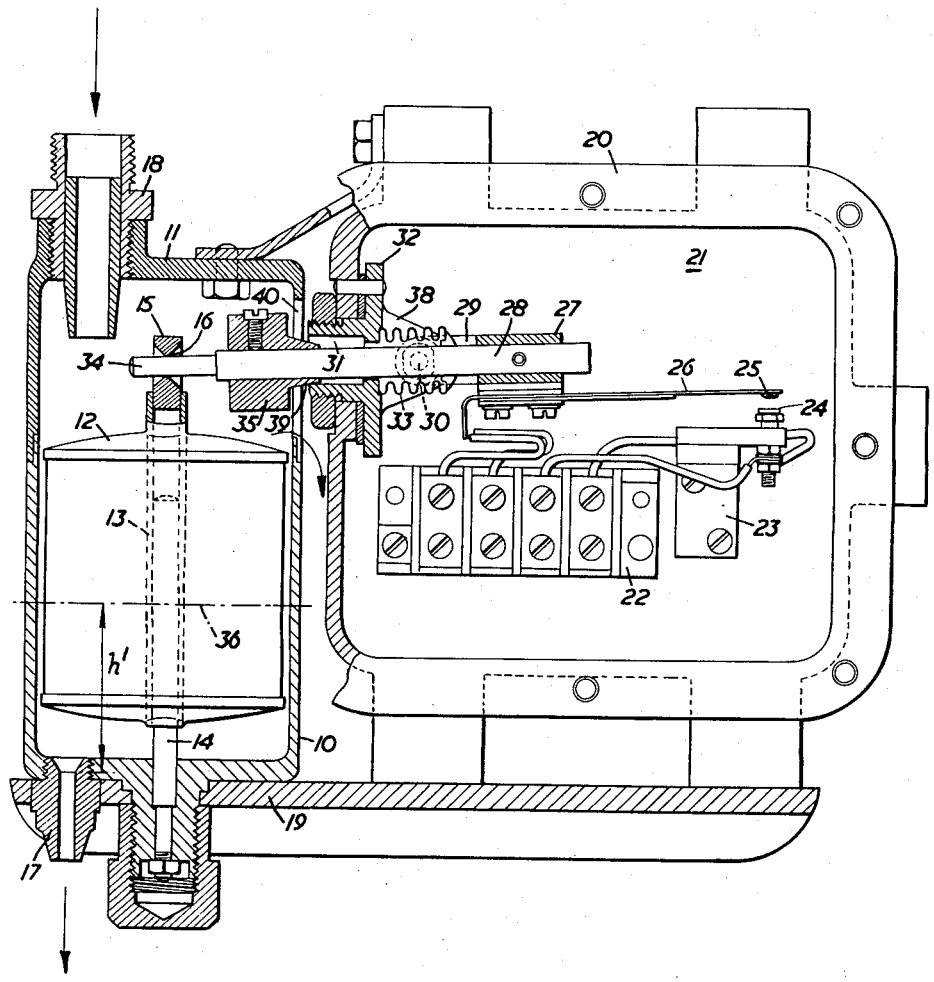
INVENTOR
GEORGE C. R. BIRCH
BY
Watson, Cole, Grindle & Watson
ATTORNEYS,

3,028,463
SWITCH APPARATUS RESPONSIVE TO LIQUID FLOW

George Christian Ross Birch, New Malden, England, assignor to A.R.I.C. Limited, Morden, England, a British company
Filed Jan. 19, 1959, Ser. No. 787,688
Claims priority, application Great Britain Jan. 22, 1958
5 Claims. (Cl. 200—81.9)

This invention relates to apparatus for actuating a switch when the flow of a liquid ceases or falls substantially below a normal rate.

It is an object of the invention to provide such apparatus which has no electrical parts exposed to the liquid.

It is a further object to provide such apparatus suitable for use in conjunction with inflammable liquids or in other locations where exposed electrical contacts or conductors are contraindicated.

The invention resides broadly in a float chamber having an outlet orifice adjacent its bottom and also an overflow outlet, the float being mechanically connected to electrical switch contacts contained in a hermetically sealed compartment.

The rate at which liquid will flow out of the float chamber through the outlet orifice depends upon the head of liquid above the orifice. If the head is constant, i.e. if the inflow is such that liquid is overflowing from the float chamber and then the rate of inflow decreases to such an extent that the outflow through the orifice exceeds the inflow, the liquid level in the float chamber will fall until the head above the outlet orifice has decreased to a value such that the rate of outflow will equal the rate of inflow. A drop in the level of liquid therefore gives an indication that the rate of flow has ceased or has been substantially reduced. Falling of the float in response to such a drop in the level of liquid actuates the switch contacts. The float is connected to a movable switch contact by a lever which enters the sealed compartment.

In one form of the invention the lever is provided with a slider weight. The slider weight may serve several purposes. It may be used to counterbalance the weight of other parts carried by the lever, or to adjust the effective weight of the float and hence the relationship between the height of the float and the rate of flow, or as a stop to limit the extent of angular movement of the lever, or for a combination of these functions.

The lever passes through an aperture in a wall of the compartment and is sealed thereto by a flexible seal, such as a flexible metal bellows, one part of which is sealed to the wall around the said aperture and another part of which is sealed to the lever.

The invention may be performed in various ways and one particular form of apparatus embodying the invention will now be described by way of example with reference to the accompanying drawing which is a sectional elevation of the apparatus.

Referring to the drawing, the apparatus comprises a chamber 10 having a removable cover 11 and containing a float 12, the float being provided with a central guide tube 13 which can slide over a guide rod 14 which is fixed in the bottom of the chamber 10. Fitted in the top of the guide tube 13 is an eye member 15 having chamfered side portions to provide a central knife-edged eye 16. Screwed into the bottom of the chamber 10 is an outlet orifice member 17, while screwed into the cover 11 is an inlet connection 18.

The chamber 10 is mounted on a support 19.

Also mounted on the support 19 is a switch casing 20 containing a switch chamber 21 which is hermetically sealed from the surroundings. Mounted within the chamber 21 is a terminal block 22 to which are connected insulated conductors (not shown) which pass through the casing through sealed apertures therein. Also mounted in the chamber 21 is a contact block 23 carrying a fixed switch contact 24. Co-operating with the contact 24 is a movable contact 25 mounted on the extremity of a leaf spring 26. The other end of this leaf spring is secured to a yoke 27 fixed to a lever 28. The yoke 27 has arms 29 (only one of which is visible in the drawing) extending to the left in the drawing. Trunnion pins 30 are screwed into the arms 29 and rotate in lugs 38 extending from a fitting 32 which passes through and is sealed against the walls of the casing 20. The trunnions 30 act as a fulcrum for the lever 28. The lever 28 passes out of the chamber 21 through an aperture 31 in the fitting 32. The lever 28 is sealed to the fitting 32 by means of a flexible bellows seal 33, so that although the lever 28 can rock freely, the hole through which it passes out of the chamber 21 is hermetically sealed. The left-hand end 34 of the lever 28 passes through a slot 40 in the chamber 10 and enters the eye 16, so that the angular position of the lever 28 is determined by the height of the float 12. Carried on the left-hand portion of the lever 28 is a slider weight 35 the position of which is adjustable to counterbalance the weights of the yoke 27, the contact 25 and the leaf spring 26, to ensure that the float will fall when the liquid level falls and the contacts will open when the level has fallen to a predetermined low value. The slider weight has a conical formation 39 which partially enters the aperture 31 and acts as a stop to limit the angular movement of the lever and to prevent excessive contact pressure at high liquid levels.

The apparatus works as follows:

Liquid is introduced into the chamber 10 through the inlet connection 18, and runs out of the chamber 10 through the orifice in the outlet member 17. At the normal rate of flow the inflow is greater than the outflow through this orifice, the surplus running out through the slot 40. In this condition the float is in an upper position in which the conical formation 39 is against the upper edge of the aperture 31 and the contacts 24, 25 are closed. Increase in the normal flow will not affect the height of the float or the condition of the contacts. On the other hand, a reduction in the normal flow to a predetermined low value which, for instance, may be equal to the outflow through the orifice member 17 at a head $h^1$, will cause the liquid surface in chamber 10 to fall rapidly to the level indicated by the line 36. This line is at the head $h^1$ above the orifice member 17, at which head the outflow exactly balances the inflow. The float will fall correspondingly, tilting the lever 28 and opening the contacts 24, 25. By suitable adjustment of the position of the slider weight 35, the contacts 24, 25 can be arranged to open exactly at a desired predetermined level of the liquid, i.e. at a desired low rate of inflow. Opening of the contacts 24, 25 breaks an electric circuit the interruption of current in this circuit being utilised for indication or control purposes.

The clearance between the float 12 and the walls of the chamber 10 should be small so that the time taken for the liquid level to fall in the event of a reduction in the rate of inflow will be as short as possible.

What I claim as my invention and desire to secure by Letters Patent is:

1. Switch apparatus responsive to a substantial reduction in the rate of flow of a liquid below a normal rate, comprising a vessel having sides and a bottom, inlet means for admitting liquid into said vessel, overflow outlet means from said vessel, outlet orifice means adjacent the bottom of said vessel, the area of said outlet orifice means being smaller than the area of said inlet means and the height of said overflow outlet means above said outlet orifice means being such that at said normal rate of flow some of said liquid overflows at said overflow outlet means, a float floating in the liquid in the said vessel, said float having an upper position which it occupies when said liquid overflows at said overflow outlet means and at least one lower position which it occupies when there is no such overflowing, a hermetically sealed switch compartment, a lever having one arm outside said compartment and another arm within said compartment, means connecting said one arm of said lever to said float whereby said lever is moved by said float in response to changes in liquid level in said vessel, a movable electrical switch contact mounted on said other arm of said lever within said compartment, a stationary electrical switch contact within said compartment, said switch contacts having a contacting condition and a separated condition, said contacts being in one of said conditions when said float is in said upper position and being in the other of said conditions when said float is in said lower position.

2. Apparatus according to claim 1 which also includes means defining an aperture in a wall of said sealed compartment, a fulcrum for said lever adjacent said aperture, and a flexible bellows sealed to said wall around said aperture and sealed to said lever adjacent said fulcrum.

3. Apparatus according to claim 1 in which there is a slider weight on said lever outside said hermetically sealed compartment.

4. Apparatus according to claim 2 including also a two-armed yoke mounted on said lever within said hermetically-sealed compartment and trunnion pins entered into apertures in the arms of said yoke and constituting said fulcrum for said lever, and in which at least a portion of said flexible bellows lies between said arms of said yoke adjacent said trunnion pins.

5. Apparatus according to claim 3 which includes fixed stop means and in which said slider weight is provided wtih a stop formation adapted to co-operate with said fixed stop means to limit the angular movement of said lever.

References Cited in the file of this patent

UNITED STATES PATENTS

| | | |
|---|---|---|
| 1,185,144 | Stukel | May 30, 1916 |
| 1,264,115 | Moore | Apr. 23, 1918 |
| 1,972,815 | Anneren | Sept. 4, 1934 |
| 2,035,371 | Johnson et al. | Mar. 24, 1936 |
| 2,043,530 | Dezotell | June 9, 1936 |
| 2,134,104 | Cressy | Oct. 25, 1938 |
| 2,244,131 | Van Norstrand | June 3, 1941 |
| 2,304,822 | Harrison et al. | Dec. 15, 1942 |
| 2,713,678 | Krokstrand | July 19, 1955 |
| 2,812,511 | Cleveland | Nov. 5, 1957 |
| 2,815,765 | Adelson | Dec. 10, 1957 |

FOREIGN PATENTS

| | | |
|---|---|---|
| 656,557 | France | Jan. 11, 1929 |